(12) United States Patent
Lee

(10) Patent No.: US 11,815,590 B2
(45) Date of Patent: Nov. 14, 2023

(54) CYLINDRICAL ARRAY RADAR

(71) Applicant: FIONSYSTEMS, Inc., Seoul (KR)

(72) Inventor: Han Seok Lee, Gyeonggi-do (KR)

(73) Assignee: FIONSYSTEMS, Inc., Seoul (KR)

( * ) Notice: Subject to any disclaimer, the term of this patent is extended or adjusted under 35 U.S.C. 154(b) by 0 days.

(21) Appl. No.: 17/801,588

(22) PCT Filed: Mar. 18, 2022

(86) PCT No.: PCT/KR2022/003827
§ 371 (c)(1),
(2) Date: Aug. 23, 2022

(65) Prior Publication Data
US 2023/0314587 A1 Oct. 5, 2023

(51) Int. Cl.
| | | |
|---|---|---|
| G01S 13/42 | (2006.01) | |
| G01S 7/28 | (2006.01) | |
| G01S 7/282 | (2006.01) | |
| G01S 13/02 | (2006.01) | |

(52) U.S. Cl.
CPC ............ *G01S 13/426* (2013.01); *G01S 7/282* (2013.01); *G01S 7/2813* (2013.01); *G01S 2013/0245* (2013.01)

(58) Field of Classification Search
CPC ...... G01S 13/426; G01S 7/2813; G01S 7/282; G01S 2013/0245; G01R 33/3614; H01Q 21/0056
USPC ......................................................... 342/158
See application file for complete search history.

(56) References Cited

U.S. PATENT DOCUMENTS

| | | | | |
|---|---|---|---|---|
| 5,179,386 A | * | 1/1993 | Rudish ................. | G01S 13/426 342/373 |
| 5,430,453 A | * | 7/1995 | Rudish ................. | G01S 13/426 342/373 |
| 7,315,276 B1 | * | 1/2008 | Rihaczek ............ | H01Q 21/061 342/158 |

(Continued)

FOREIGN PATENT DOCUMENTS

| | | | |
|---|---|---|---|
| JP | 2007081976 A | * | 3/2007 |
| KR | 10-0875894 B1 | | 12/2008 |

(Continued)

OTHER PUBLICATIONS

Jung, J. W., and S. K. Lee. "A study on pattern nulling for phased array antenna system." The Journal of Korean Institute of Information Technology 18.1 (2020): 67-75. (Year: 2020).*

(Continued)

*Primary Examiner* — Bernarr E Gregory
(74) *Attorney, Agent, or Firm* — Harness, Dickey & Pierce, P.L.C.

(57) ABSTRACT

Disclosed is a cylindrical array radar including: a ring array having a plurality of Tx/Rx modules arranged in a circular shape for transmitting and receiving high-frequency signals of a radar frequency band, and a ring array signal processing unit arranged at the center of the array of the Tx/Rx modules for processing signal data exchanged with the plurality of Tx/Rx modules; and a main signal processing unit that performs antenna beamforming for the plurality of Tx/Rx modules and signal processing for detecting and tracking a target. It is possible to achieve omnidirectional antenna detection without mechanical rotation and easily obtain performance change.

10 Claims, 9 Drawing Sheets

(56) References Cited

U.S. PATENT DOCUMENTS

| | | | | |
|---|---|---|---|---|
| 2004/0227682 | A1* | 11/2004 | Anderson | H01Q 7/00 |
| | | | | 343/742 |
| 2011/0285582 | A1* | 11/2011 | Zhang | G01S 7/024 |
| | | | | 342/175 |
| 2012/0062230 | A1* | 3/2012 | Vaughan, Jr. | G01R 33/3614 |
| | | | | 324/318 |
| 2012/0206291 | A1* | 8/2012 | Schuman | H01Q 3/242 |
| | | | | 342/174 |
| 2015/0192671 | A1 | 7/2015 | Zhang et al. | |
| 2015/0323659 | A1* | 11/2015 | Mitchell | G01S 13/02 |
| | | | | 342/41 |
| 2019/0293788 | A1* | 9/2019 | Madia | G01S 13/426 |

FOREIGN PATENT DOCUMENTS

| | | | | | |
|---|---|---|---|---|---|
| KR | | 875894 | B1 * | 12/2008 | |
| KR | 10-1797606 | | B1 | 11/2017 | |
| KR | | 1797606 | B1 * | 11/2017 | G01S 13/26 |
| KR | 10-2021-0004054 | | A | 1/2021 | |
| KR | | 2021004054 | A * | 1/2021 | H01Q 1/241 |

OTHER PUBLICATIONS

Notice of Allowance from corresponding Korean Patent Application No. 10-2022-0033827, dated Jul. 20, 2022.
Office Action from corresponding Korean Patent Application No. 10-2022-0033827, dated May 18, 2022.
Jung, J., et al; "A Study on Pattern Nulling for Phased Array Antenna System", Journal of KIIT, vol. 18, No. 1, pp. 67-75, Jan. 31, 2020.

* cited by examiner

CYLINDRICAL ARRAY RADAR

CROSS-REFERENCE TO RELATED APPLICATIONS

This application is a national phase application of PCT Application No. PCT/KR2022/003827, filed on Mar. 18, 2022, which claims priority to Korean Patent Application No. 10 2022 0033827, filed on Mar. 18, 2022. The entire disclosure of the applications identified in this paragraph is incorporated herein by reference.

TECHNICAL FIELD

The present invention relates to a radar, and in particular, to a cylindrical array radar that detects a small unmanned aerial vehicle such as a drone in omnidirectional space to prevent risks or accidents caused by the drone appearing in an important facility in advance.

BACKGROUND

Industries based on a small unmanned aerial vehicle (hereinafter, referred to as "UAV") called a drone and related technologies are rapidly developing around the world. As drones are attracting attention as a new growth industry, their value and utility are growing. However, concerns are also being voiced as threats and side effects of the drones increase accordingly. In particular, illegal use of drones, such as terrorism, and side effects such as collisions with manned aircraft caused by drones flying near airports are becoming very serious.

In order to address such problems, there have been attempts to develop a technology for detecting or disabling the drone in advance. However, since recent drones are small in size and are formed of non-metallic materials, it is difficult to detect the drones with the existing 2D radar.

Moreover, in the case of a drone mounted with a dangerous substance such as a bomb, it is essential to detect the approaching drone in advance to reliably obtain a response time from the distance. Accordingly, there is a need for a detection device (radar) that can provide customized performance that satisfies the detection performance requirement.

In order to detect a target in all directions, most of the existing radars for detecting drones are provided with a large number of radars capable of detecting a specific sector or mechanically rotate the radar antenna. In order to modify the model, for example, for increasing or decreasing the detection performance, it is necessary to develop new hardware disadvantageously. In addition, since the existing radars can only be used for radar purposes and fail to provide other functions, they have a limitation that it is difficult to provide complex functions.

SUMMARY

Problems to be Solved by the Invention

The present invention has been devised to address the problems of the prior art described above, and its object is to provide a cylindrical array radar capable of easily changing performance and easily generating beams from the antenna radar in a specific direction to rotate the generated beam, so that it is possible to detect all directions without necessitating a mechanical rotation or installing a plurality of radars.

In addition, another object is to provide a cylindrical array radar capable of implementing various additional functions in a complex manner in addition to the radar application.

Means for Solving the Problems

In order to address the aforementioned problems, according to the present invention, there is provided a cylindrical array radar including: a ring array having a plurality of Tx/Rx (Transmit/Receive) modules arranged in a circular shape for transmitting and receiving high-frequency signals of a radar frequency band, and a ring array signal processing unit arranged at the center of the array of the Tx/Rx modules for processing signal data exchanged with the plurality of Tx/Rx modules; and a main signal processing unit that performs antenna beamforming for the plurality of Tx/Rx modules and signal processing for detecting and tracking a target.

In this case, the plurality of Tx/Rx modules of the ring array may be arranged in a circular shape along the edge of the upper surface, the ring array signal processing unit is installed at the center of the upper surface, and the cylindrical array radar further has a bottom plate having a plurality of through-holes.

In addition, the plurality of ring arrays may be stacked in a vertical direction. In addition, at least one of a radio wave blocking device and an RF detection device may be installed on the upper surface of any one of the plurality of ring arrays stacked in the vertical direction.

In addition, each of the Tx/Rx modules may have a housing having a width gradually increasing from the inner side facing the ring array signal processing unit toward the outside, an antenna unit installed on the open outer surface of the housing, a ground unit installed inside the housing, a high-frequency transceiver unit installed inside the housing, and a high-frequency Tx/Rx processing unit installed inside the housing and connected to the high-frequency transceiver unit.

In addition, the cylindrical array radar may further include a radome having a main body surrounding the ring array and the main signal processing unit, and a cover installed on the open upper surface of the main body.

In addition, the cylindrical array radar may further include a base provided under the ring array, the main body of the radome being seated on the base; a plurality of cooling fans installed in the base; and a filter frame installed inside the cover of the radome and provided with a filter, so that external air flowing through a gap between the main body and the cover during rotation of the cooling fans passes through the filter and is downwardly discharged out of the radome.

Meanwhile, beamforming for the antenna beams radiated from the plurality of Tx/Rx modules is performed on the basis of the following equation:

$$A(\theta) = \sum_i \alpha_i e^{sgn(i) j \phi_i} S_i(t)$$

where "$A(\theta)$" refers to a beamforming radiation pattern of the antenna beam,
"$S_i(t)$" refers to a signal of the (i)th Tx/Rx module,
"$\alpha_i$" refers to a signal magnitude weight for the (i)th Tx/Rx module, and
"$\phi_i$" refers to a phase weight value for the (i)th Tx/Rx module.

Advantageous Effects

Using the cylindrical array radar according to the present invention configured as described above, it is possible to implement omnidirectional rotation of the antenna beam without mechanical rotation by means of the circularly arranged Tx/Rx modules. Therefore, it is possible to achieve omnidirectional detection and remove necessity of a plurality of radar devices for omnidirectional detection. Accordingly, it is possible to save installation space and reducing cost.

In addition, it is possible to easily obtain performance change by stacking a plurality of ring arrays as necessary.

In addition, it is possible to quickly respond to market demands by providing various complex functions by installing a radio wave blocking device, an RF detection device, and the like.

DETAILED DESCRIPTION

Best Mode for Embodying the Invention

According to the present invention, a cylindrical array radar includes: a ring array having a plurality of Tx/Rx modules arranged in a circular shape for transmitting and receiving high-frequency signals of a radar frequency band, and a ring array signal processing unit arranged at the center of the array of the Tx/Rx modules for processing signal data exchanged with the plurality of Tx/Rx modules; and a main signal processing unit that performs antenna beamforming for the plurality of Tx/Rx modules and signal processing for detecting and tracking a target.

Embodiments

A cylindrical array radar according to an embodiment of the present invention will now be described in details with reference to the accompanying drawings.

Figure 1:
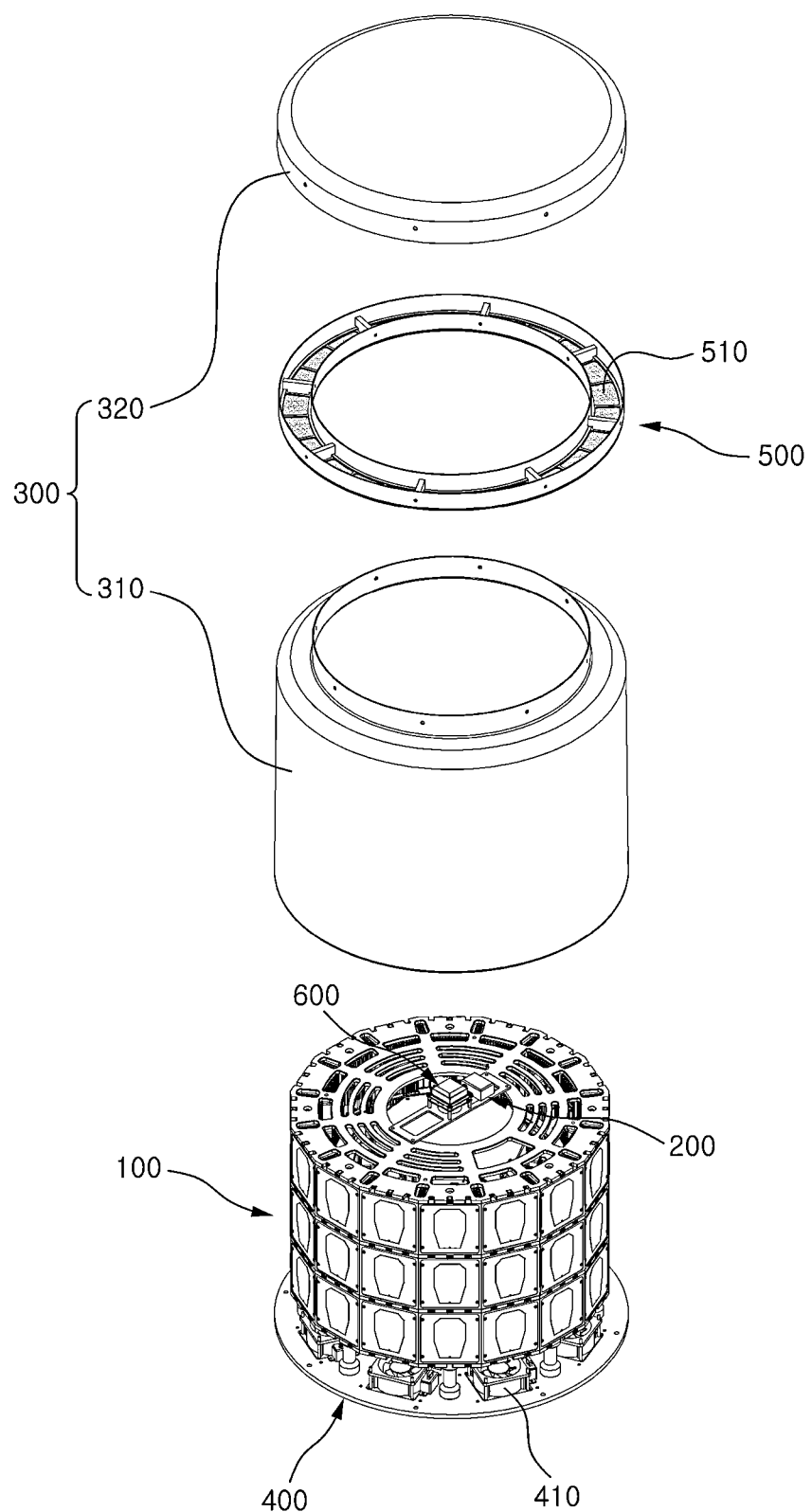
FIGS. 1, 2 and 3 are diagrams illustrating a cylindrical array radar according to the present invention.
Figure 2:
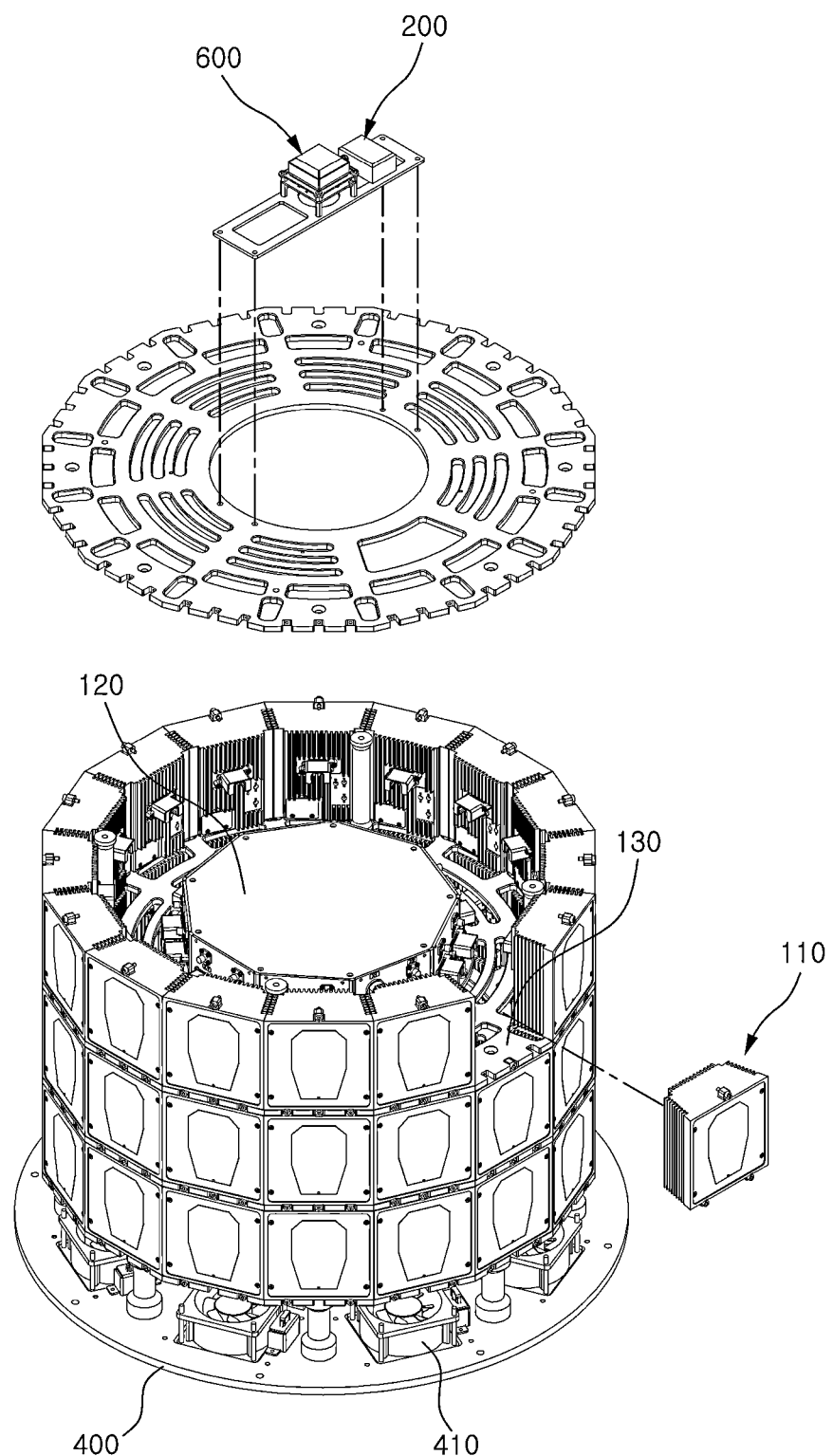
Figure 3:
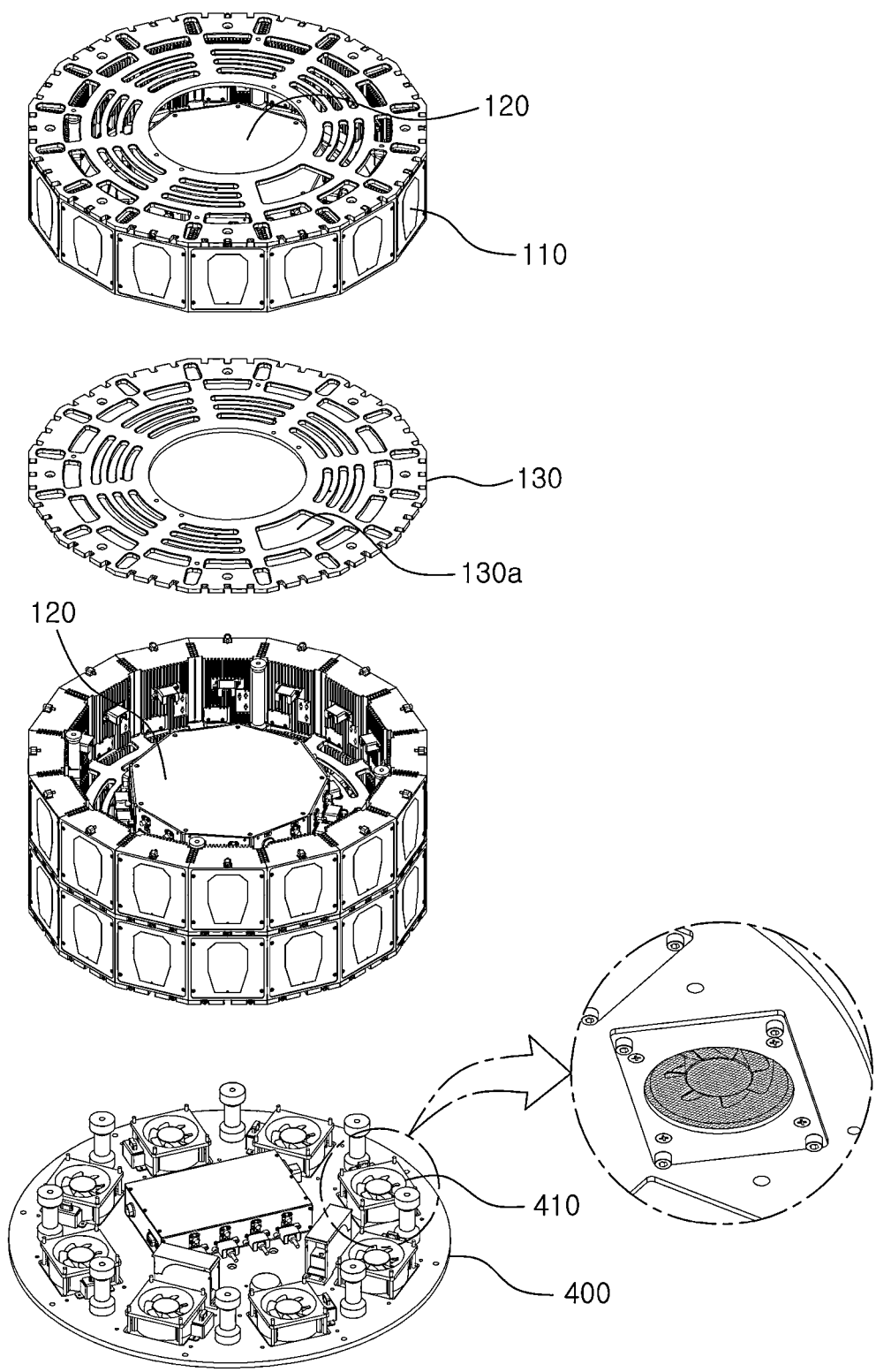
Figure 4:
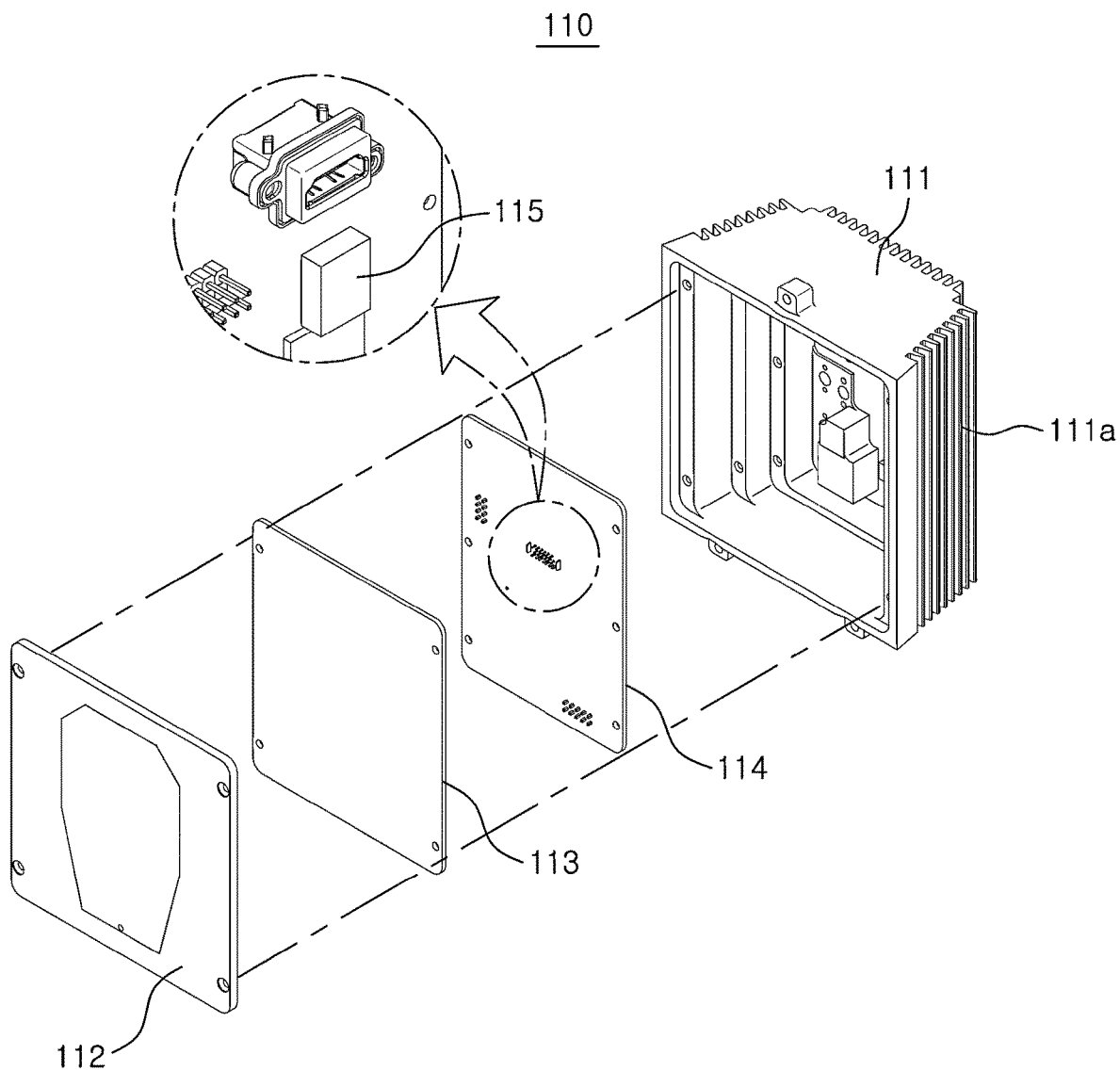
FIG. 4 is a diagram illustrating a transmit/receive (Tx/Rx) module of the cylindrical array radar according to the present invention.
Figure 5:
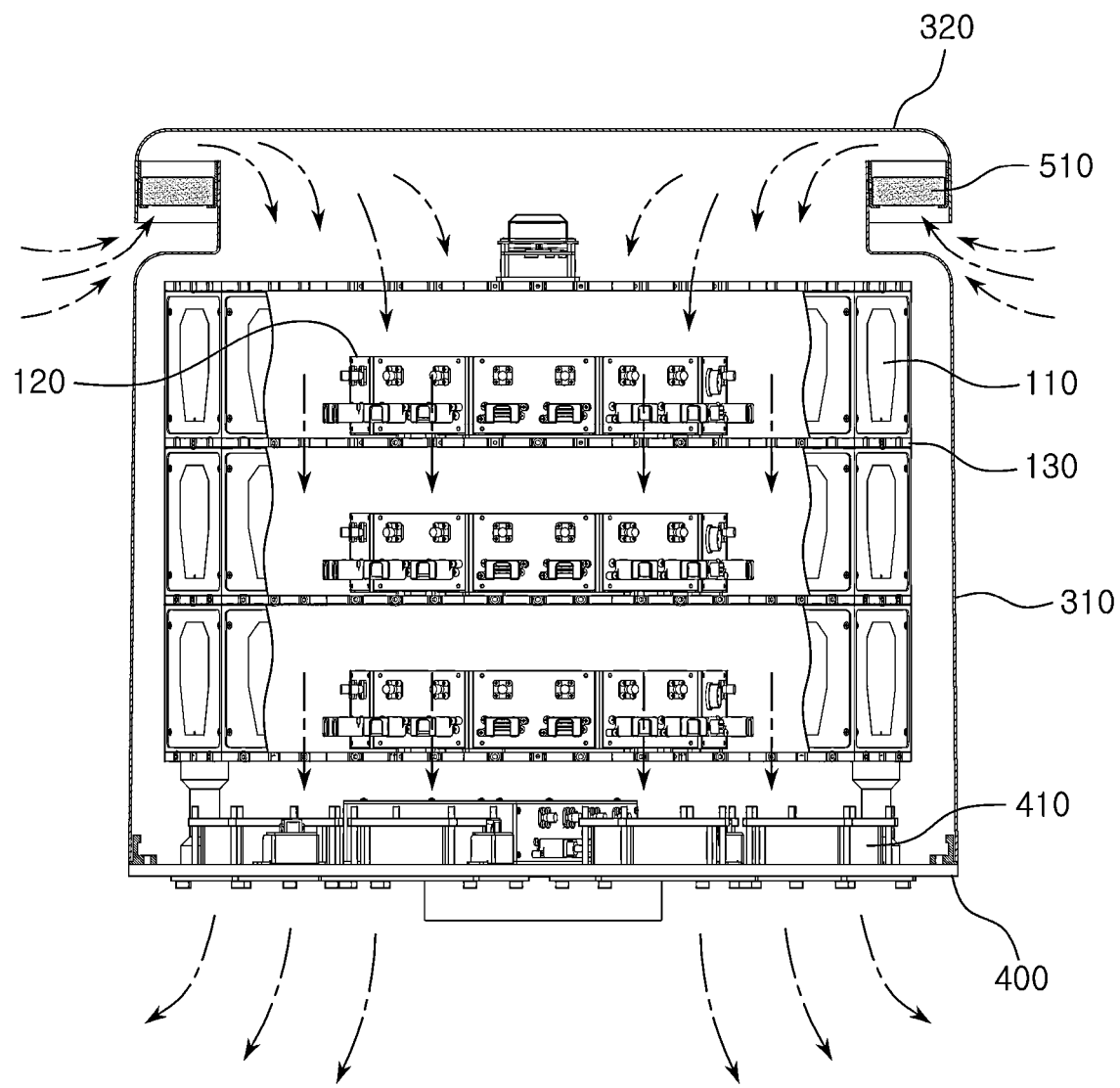
FIG. 5 is a diagram illustrating heat dissipation in the cylindrical array radar according to the present invention.

FIGS. 1 to 3 are diagrams illustrating a cylindrical array radar according to the present invention. FIG. 4 is a diagram illustrating a transmit/receive (Tx/Rx) module of the cylindrical array radar according to the present invention. FIG. 5 is a diagram illustrating heat dissipation in the cylindrical array radar according to the present invention.

Figure 6:
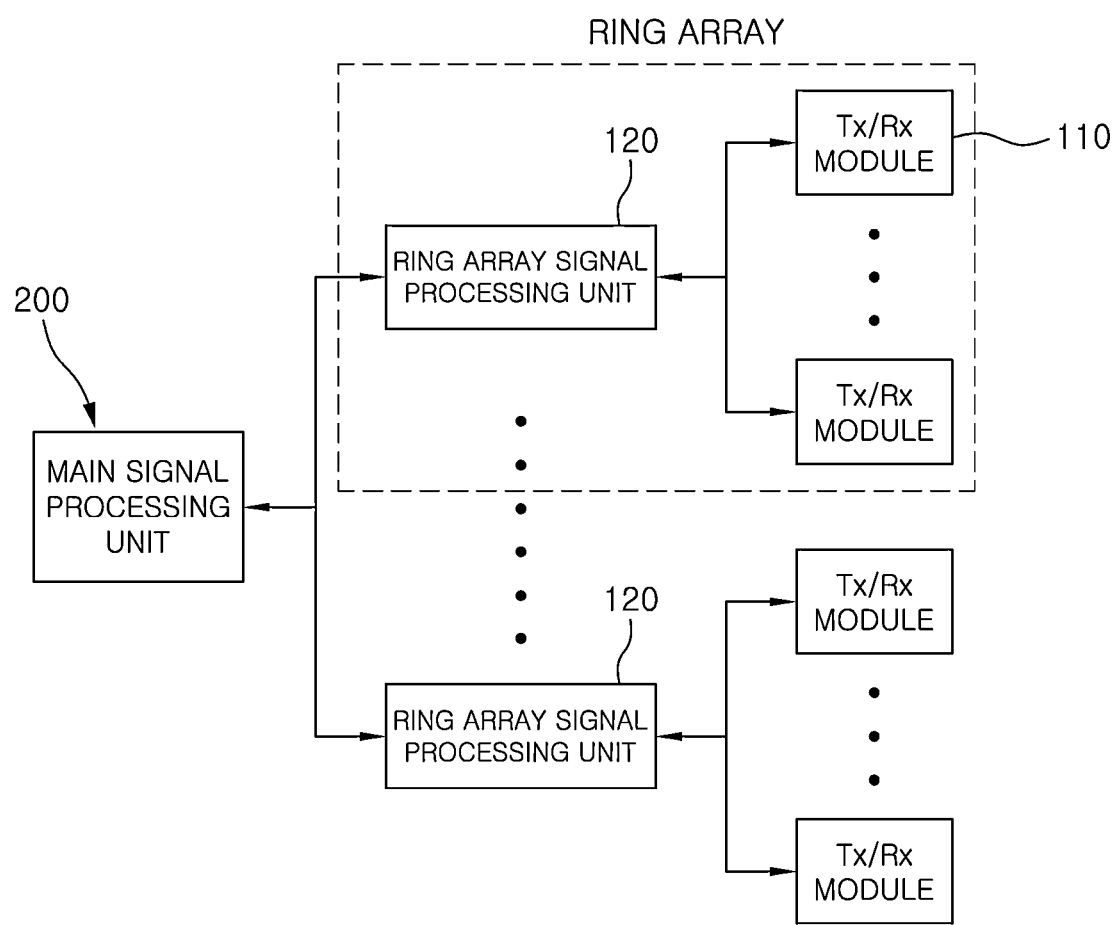
FIGS. 6 and 7 are diagrams illustrating a transmit/receive (Tx/Rx) relationship between the main signal processing unit and the ring array of the cylindrical array radar according to the present invention.
Figure 7:
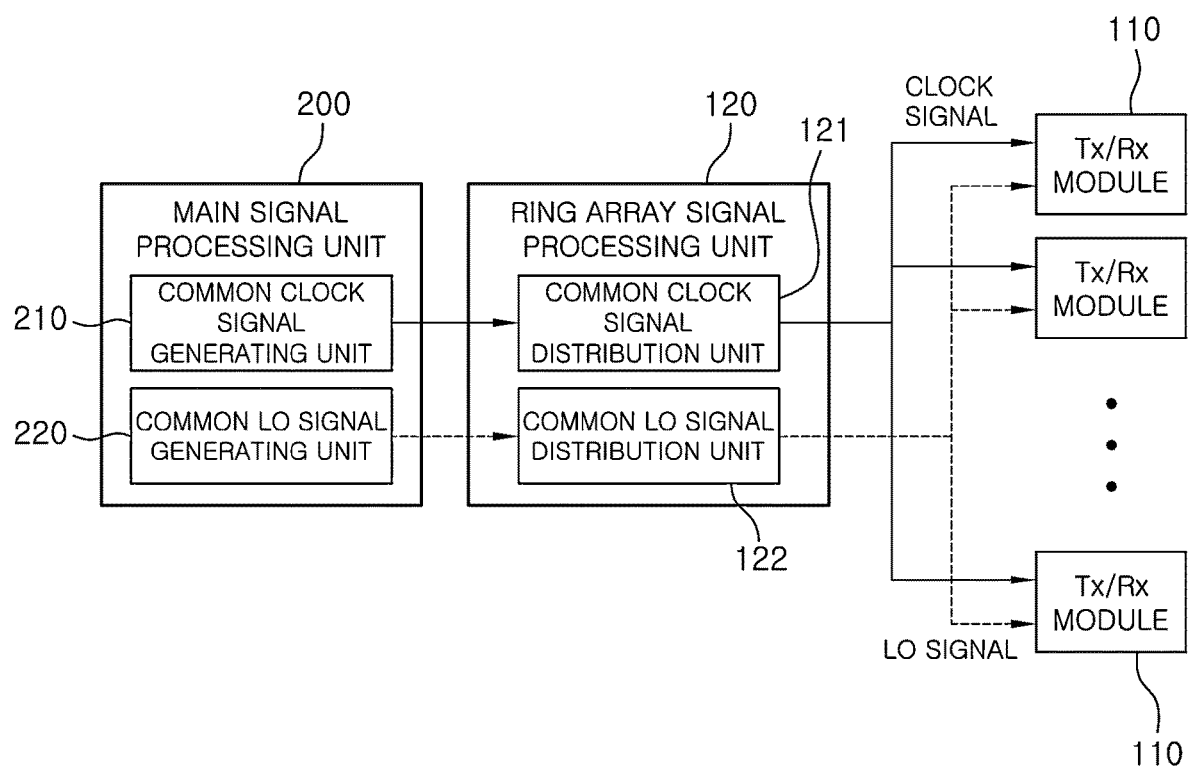
Figure 8:
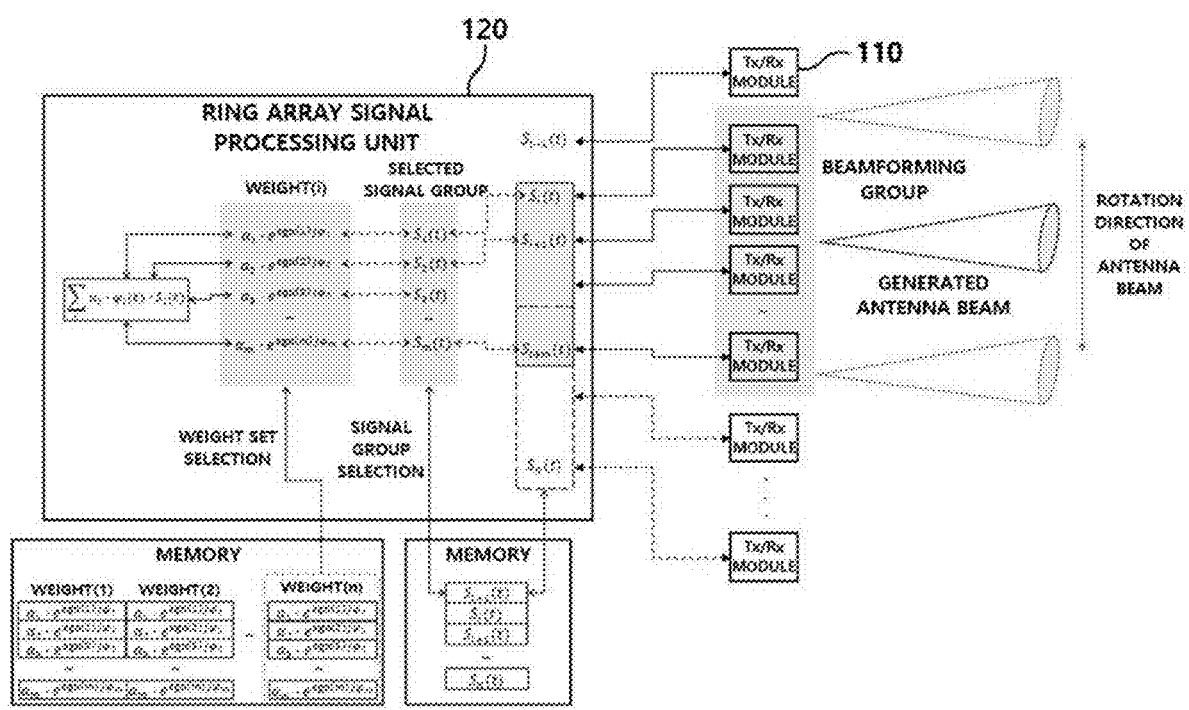
FIG. 8 is a block diagram illustrating a beamforming method of a cylindrical array radar according to the present invention.
Figure 9:
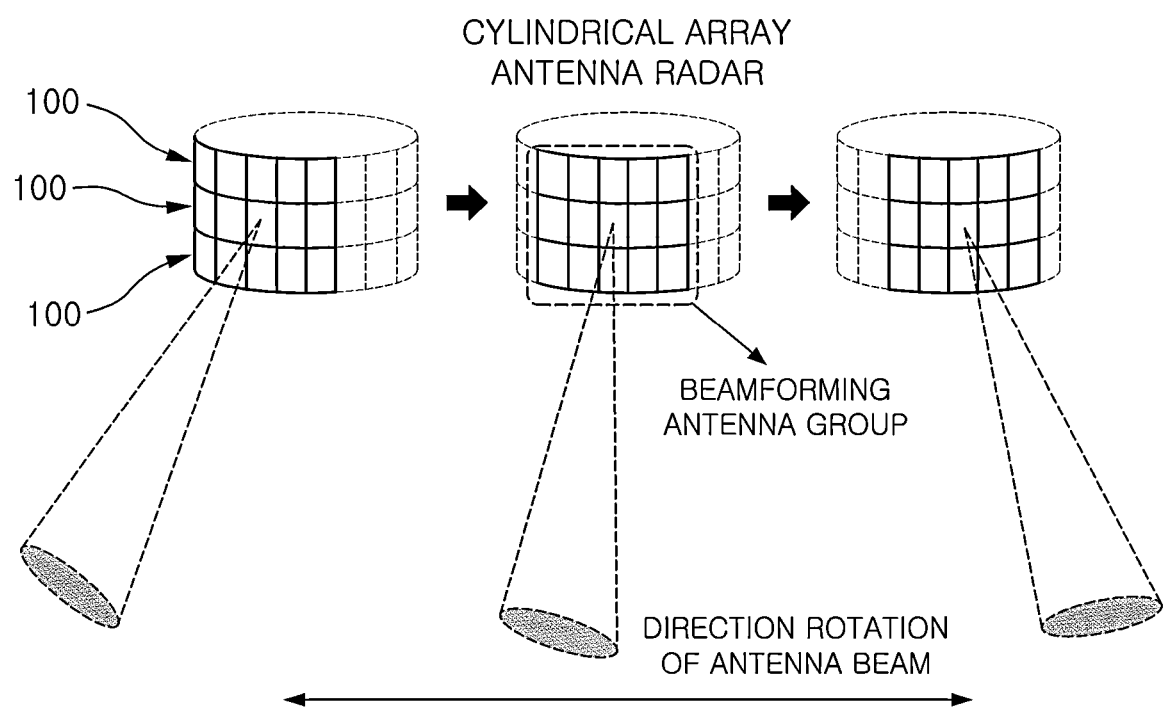
FIG. 9 is a diagram illustrating a transmit/receive (Tx/Rx) module is dynamically selected for an omnidirectional detection scan of a cylindrical array radar according to the present invention.

FIGS. 6 and 7 are diagrams illustrating a Tx/Rx relationship between a main signal processing unit and a ring array of the cylindrical array radar according to the present invention. FIG. 8 is a block diagram illustrating a beamforming method of the cylindrical array radar according to the present invention. FIG. 9 is a diagram illustrating a state in which the Tx/Rx module is dynamically selected for omnidirectional detection scanning of the cylindrical array radar according to the present invention.

The cylindrical array radar according to the present invention includes a ring array 100 and a main signal processing unit 200 that exchanges signals with the ring array 100.

The ring array 100 includes a plurality of Tx/Rx modules 110 arranged in a circular shape, a ring array signal processing unit 120 arranged at the center of the plurality of Tx/Rx modules 110 and electrically connected to the plurality of Tx/Rx modules 110 through cables, and a bottom plate 130 on which the plurality of Tx/Rx modules 110 and the ring array signal processing unit 120 are installed.

The Tx/Rx module 110 transmits and receives a high-frequency signal of the radar frequency band. A plurality of Tx/Rx modules 110 are arranged in a circle along the edge of the upper surface of the bottom plate 130.

Here, focusing on the configuration of the Tx/Rx module 110 in more detail, the Tx/Rx module 110 according to the present invention includes a housing 111 and an antenna unit 112 installed in the housing 111. In addition, the Tx/Rx module 110 includes a ground unit 113, a high-frequency transceiver unit 114, and a high-frequency Tx/Rx processing unit 115 installed inside the housing 111.

The housing 111 has a shape in which the width gradually increases from the inner side facing the ring array signal processing unit 120 to the outer side. Therefore, when the housing 111 is viewed from above, it takes a trapezoidal shape with a narrow inside and a wide outside.

When a plurality of Tx/Rx modules 110 are arranged in a circular shape along the edge of the upper surface of the bottom plate 130, both sides of the housings 111 abut on each other, and a plurality of heat dissipation fins 111a are provided on the inner side and both sides to facilitate heat dissipation.

The antenna unit 112 is installed to the open outer side of the housing 111 to radiate an antenna beam.

The ground unit 113 is installed to be spaced apart from the antenna unit 112 to perform a grounding function.

The high-frequency transceiver unit 114 is installed inside the housing 111, and is spaced apart from the ground unit 113, so as to transmit and receive a high frequency signal of the radar frequency band.

The high-frequency Tx/Rx processing unit 115 is installed inside the housing 111, and is connected to the high-frequency transceiver unit 114, so as to process the radar high-frequency signal transmitted and received by the high-frequency transceiver unit 114.

The ring array signal processing unit 120 is installed at the center of the upper surface of the bottom plate 130 to transmit and receive signal data to and from a plurality of Tx/Rx modules 110 and process the signal data.

More specifically, when a radar signal is transmitted from the ring array signal processing unit 120, the transmitted signal is upwardly converted to the radar frequency band by the Tx/Rx module 110. Then, the converted signal is transmitted to the drone as a target, and the high-frequency signal returns after collision. When the returned signal is received by the Tx/Rx module 110, the received signal is downwardly converted and is transmitted to the ring array signal processing unit 120. In this case, the signal exchanged between the ring array signal processing unit 120 and the Tx/Rx module 110 may be digital or analog.

The bottom plate 130 is circular in its overall shape so as to allow the Tx/Rx module 110 and the ring array signal processing unit 120 to be installed on the upper surface. In addition, a plurality of through-holes 130a are formed to promote heat dissipation.

Meanwhile, a plurality of ring arrays 100 formed by installing the Tx/Rx modules 110 and the ring array signal processing unit 120 on the bottom plate 130 may be stacked in a vertical direction. In this way, by adjusting the number of stacks of the ring arrays 100 to form a cylindrical shape having different heights, the performance of the radar can be variously changed.

In other words, as the number of stacks of the ring arrays 100 increases, the detection range of the radar is expanded, the accuracy of detection performance is improved, so as to implement a 3D radar capable of calculating 3D information on the distance, direction, and altitude of the target. Therefore, it is possible to easily obtain a customized model satisfying target performance and price requirements.

In addition, according to the present invention, one or more devices that provide a radio wave blocking device, an RF detection device, and other functions are provided on the upper surface of any one of the ring arrays 100 stacked in the vertical direction, so as to provide various functions in a complex manner.

The main signal processing unit 200 performs antenna beamforming for a plurality of Tx/Rx modules 110 by applying AESA (active electronically scanned array) technology, and performs signal processing for detecting and tracking a target. The main signal processing unit 200 is installed inside of the radome 300, that is, either the upper or lower side of the ring array 100.

As illustrated in FIG. 9, the main signal processing unit 200 can generate antenna beams for a specific direction by dynamically grouping and selecting a plurality of Tx/Rx modules 110, and can easily rotate the antenna beams by group-selecting a plurality of Tx/Rx modules 110. This function allows omnidirectional detection according to the present invention without mechanically rotating or installing a plurality of radar devices.

Specifically, in order to implement the AESA type radar and beamforming, it is necessary to synchronize signal timing, frequency, and phase between the Tx/Rx modules 110. For this purpose, according to the present invention, as illustrated in FIG. 7, a common clock signal generating unit 210 and a common LO signal generating unit 220 of the main signal processing unit 200 generate a common clock signal and a common LO signal, respectively, and the common clock signal and the common LO signal are distributed to all Tx/Rx modules 110 through a common clock signal distribution unit 121 and a common LO signal distribution unit 122 of the ring array signal processing unit 120. This enables synchronization of timing, frequency and phase between a plurality of Tx/Rx modules 110.

According to the present invention, beamforming for the beams radiated from the antenna unit 112 of the Tx/Rx module 110 are performed on the basis of the following equation, in which weights having different magnitudes and phases are applied to the signals of each Tx/Rx module 110, and they are summed.

[Equation]

$$A(\theta) = \sum_i \alpha_i e^{sgn(i) j \phi_i} S_i(t)$$

where "$A(\theta)$" refers to a beamforming radiation pattern of the antenna beam,
"$S_i(t)$" refers to a signal of the (i)th Tx/Rx module,
"$\alpha_i$" refers to a signal magnitude weight for the (i)th Tx/Rx module, and
"$\phi_i$" refers to a phase weight value for the (i)th Tx/Rx module.

More specifically, referring to FIGS. 6 to 8, each of the Tx/Rx modules 110 and the ring array signal processing unit 120 transmit and receive signals as digital data, and the signal magnitude and phase weights and the transmitted and received signal data are stored in a memory of the ring array signal processing unit 120.

When each weight value is applied to the baseband signals generated by the ring array signal processing unit 120, and the baseband signals are transmitted to a specific group of the Tx/Rx modules 110, each Tx/Rx module 110 transmits individual signals so as to form transmission antenna beams toward a specific direction and transmit a radar signal.

The signal data input from each Tx/Rx module 110 is stored in the memory of the ring array signal processing unit 120, and the result of the calculation processing obtained by selecting a specific signal group in the ring array signal processing unit 120 and applying each weight value is a radar reflection signal received through a received antenna beam formed in a specific direction. This signal is subjected to subsequent processing for a function of detecting and tracking a radar target in the corresponding direction.

As described above, by transmitting and receiving the weight values stored in the memory of the ring array signal processing unit 120 to and from a selected specific Tx/Rx module group, an antenna Tx/Rx beam is formed in a specific direction to transmit and receive a radar signal. In addition, by successively selecting a specific Tx/Rx module group, the direction of the antenna beam is determined, so that rotation of the antenna beam for omnidirectional detection can be performed.

On the other hand, the cylindrical array radar according to the the present invention further includes a radome 300, a base 400, and a filter frame 500.

The radome 300 includes a main body 310 surrounding the ring array 100 and the main signal processing unit 200, and a cover 320 installed on the open upper surface of the main body 310.

The main body 310 has a pipe-like shape having an open top and an open bottom, and the ring array 100 and the main signal processing unit 200 are housed inside.

The cover 320 is installed on the upper surface of the main body 310. However, when the cover 320 is installed in the main body 310, a gap is generated between the cover 320 and the main body 310.

The base 400 is installed under the ring array 100, and the main body 310 of the radome 300 is seated on the upper surface of the base 400. A plurality of cooling fans 410 are installed in the base 400.

Therefore, when the cooling fans 410 rotate, external air flows into the main body 310 of the radome 300 through the gap between the main body 310 and the cover 320 of the radome 300, and then the flow changes to the downward airflow and is discharged downwardly out of the radome 300 through the cooling fans 410. Accordingly, heat generated from the ring array 100, the main signal processing unit 200, and the like can be quickly discharged to the outside.

Since a filter frame 500 having a filter 510 is installed inside the cover 320 of the radome 300, the external air flowing into the radome 300 when the cooling fans 410 rotate passes through the filter 510, flows into the radome 300, and is discharged downward.

Reference numeral 600 (now shown) refers to a global position system (GPS) for recognizing the position of the radar according to the present invention.

INDUSTRIAL AVAILABILITY

The present invention relates to a cylindrical array radar, and it can be used in the defense industry because it provides a technology for detecting and tracking a drone, which is a small flying vehicle.

What is claimed is:

1. A cylindrical array radar comprising:
a ring array having a plurality of Tx/Rx (Transmit/Receive) modules arranged in a circular shape and configured to transmit and receive high frequency signals of a radar frequency band, and a ring array signal processing unit arranged at the center of the ring array of the Tx/Rx modules and configured to process signal data exchanged with the plurality of Tx/Rx modules;
a base provided under the ring array;
a plurality of cooling fans installed on the base and configured to cause external air to flow through the ring array; and
a main signal processing unit configured to perform antenna beamforming for the plurality of Tx/Rx modules and signal processing for detecting and tracking a target.

2. The cylindrical array radar according to claim 1, further comprising a bottom plate having a plurality of through-holes, wherein the plurality of Tx/Rx modules of the ring array are arranged in a circular shape along the edge of an upper surface of the bottom plate, and the ring array signal processing unit is installed at the center of the upper surface of the bottom plate.

3. The cylindrical array radar according to claim 2, wherein the ring array is a first ring array, wherein the cylindrical array radar further comprises one or more second ring arrays each having a plurality of Tx/Rx modules arranged in a circular shape and configured to transmit and receive high frequency signals, and wherein the first ring array and the one or more second ring arrays are stacked in a vertical direction to form a plurality of ring arrays.

4. The cylindrical array radar according to claim 2, wherein at least one of a radio wave blocking device and an RF detection device is installed on an upper surface of any one of the plurality of ring arrays stacked in the vertical direction.

5. The cylindrical array radar according to claim 2, further comprising a radome having a main body surrounding the ring array and the main signal processing unit, and a cover installed on an open upper surface of the main body.

6. The cylindrical array radar according to claim 5, wherein the main body of the radome is seated on the base; and
wherein the cylindrical array radar further comprises a filter frame installed inside the cover of the radome and provided with a filter, so that external air flowing through a gap between the main body and the cover during rotation of the cooling fans passes through the filter and is downwardly discharged out of the radome.

7. The cylindrical array radar according to claim wherein each of the Tx/Rx modules has
a housing having a width gradually increasing from an inner side facing the ring array signal processing unit toward the outside,
an antenna unit installed on an open outer surface of the housing,
a ground unit installed inside the housing,
a high-frequency transceiver unit installed inside the housing, and
a high-frequency Tx/Rx processing unit installed inside the housing and connected to the high-frequency transceiver unit.

8. The cylindrical array radar according to claim 7, wherein the housing of each of the Tx/Rx modules has a plurality of heat dissipation fins provided on at least one side of the housing.

9. The cylindrical array radar according to claim 1, wherein beamforming for the antenna beams radiated from the plurality of Tx/Rx modules is performed on the basis of the following equation:

$$A(\theta) = \sum_i \alpha_i e^{sgn(i)j\phi_i} S_i(t)$$

where "$A(\theta)$" refers to a beamforming radiation pattern of the antenna beam,
"$S_i(t)$" refers to a signal of the (i)th Tx/Rx module,
"$\alpha_i$" refers to a signal magnitude weight for the (i)th Tx/Rx module, and
"$\phi_i$" refers to a phase weight value for the (i)th Tx/Rx module.

10. The cylindrical array radar according to claim 1, wherein the main signal processing unit is configured to rotate an antenna beam by dynamically grouping multiple Tx/Rx modules of the plurality of Tx/Rx modules.

* * * * *